United States Patent
Inoue

(10) Patent No.: US 8,014,663 B2
(45) Date of Patent: Sep. 6, 2011

(54) CAMERA, ACCESSORY, AND CAMERA SYSTEM

(75) Inventor: Koji Inoue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 473 days.

(21) Appl. No.: 12/031,161

(22) Filed: Feb. 14, 2008

(65) Prior Publication Data

US 2008/0199173 A1 Aug. 21, 2008

(30) Foreign Application Priority Data

Feb. 19, 2007 (JP) ................................. 2007-038487

(51) Int. Cl.
*G03B 7/00* (2006.01)
(52) U.S. Cl. ....................................................... 396/213
(58) Field of Classification Search .................. 396/213, 396/224, 532, 529, 531; 348/208.12, 360
See application file for complete search history.

(56) References Cited

U.S. PATENT DOCUMENTS

| | | | | |
|---|---|---|---|---|
| 4,477,164 | A | * | 10/1984 | Nakai et al. ...................... 396/71 |
| 4,560,267 | A | * | 12/1985 | Nakai et al. ...................... 396/64 |
| 4,682,871 | A | * | 7/1987 | Metabi ........................... 396/236 |
| 4,994,844 | A | * | 2/1991 | Azuma et al. .................. 396/211 |
| 5,065,175 | A | * | 11/1991 | Suzuki et al. .................... 396/81 |
| 5,097,283 | A | | 3/1992 | Kazumi |
| 5,214,464 | A | * | 5/1993 | Karasaki et al. ................. 396/92 |
| 5,278,603 | A | | 1/1994 | Kazumi |
| 5,761,560 | A | * | 6/1998 | Miyazawa et al. ............ 396/532 |
| 2002/0118972 | A1 | * | 8/2002 | Uenaka et al. ................ 396/532 |
| 2004/0202464 | A1 | * | 10/2004 | Miyasaka et al. ............ 396/529 |

FOREIGN PATENT DOCUMENTS

| | | |
|---|---|---|
| EP | 0435281 B1 | 12/1990 |
| EP | 0435281 A2 | 7/1991 |
| EP | 0610970 A1 | 8/1994 |
| JP | 10-239748 A | 9/1998 |
| JP | H11-073247 A | 3/1999 |
| JP | 2003-198901 A | 7/2003 |
| JP | 2004-112529 A | 4/2004 |
| JP | 2006-65068 A | 3/2006 |

* cited by examiner

*Primary Examiner* — Clayton E LaBalle
*Assistant Examiner* — Warren Fenwick
(74) *Attorney, Agent, or Firm* — Canon U.S.A., Inc., IP Division

(57) ABSTRACT

A camera includes a camera control unit configured to acquire information on an accessory mounted on the camera by performing communication with an accessory control unit included in the accessory and to control a photographing operation based on the information on the accessory. When the camera control unit acquires, from the accessory control unit, first information that is required prior to start of photographing and second information that is required prior to generation of image data after the start of photographing, if the camera control unit determines that a photographer has performed an operation to start a photographing operation during a period in which the camera control unit is performing communication to acquire the second information, the camera control unit executes a photographic sequence in priority to acquiring the second information and thereafter acquires the second information.

9 Claims, 4 Drawing Sheets

FIG. 2A

《FIRST COMMUNICATION METHOD》

| | NAME INFORMATION COMMUNICATION START COMMAND | | NAME INFORMATION COMMUNICATION DATA TRANSMISSION COMMAND | | |
|---|---|---|---|---|---|
| CAMERA→LENS | 01 | ** | 11 | 11 | 11 |
| LENS→CAMERA | ** | DATA1 | DATA2 | DATA3 | *** | null |

FIG. 2B

《SECOND COMMUNICATION METHOD》

| | NAME INFORMATION COMMUNICATION START COMMAND | AMOUNT OF DATA | NAME INFORMATION COMMUNICATION DATA TRANSMISSION COMMAND | | | |
|---|---|---|---|---|---|---|
| CAMERA→LENS | 02 | 22 | 22 | 22 | 22 | 22 |
| LENS→CAMERA | ** | n | DATA1 | DATA2 | DATA3 | *** | DATAn |

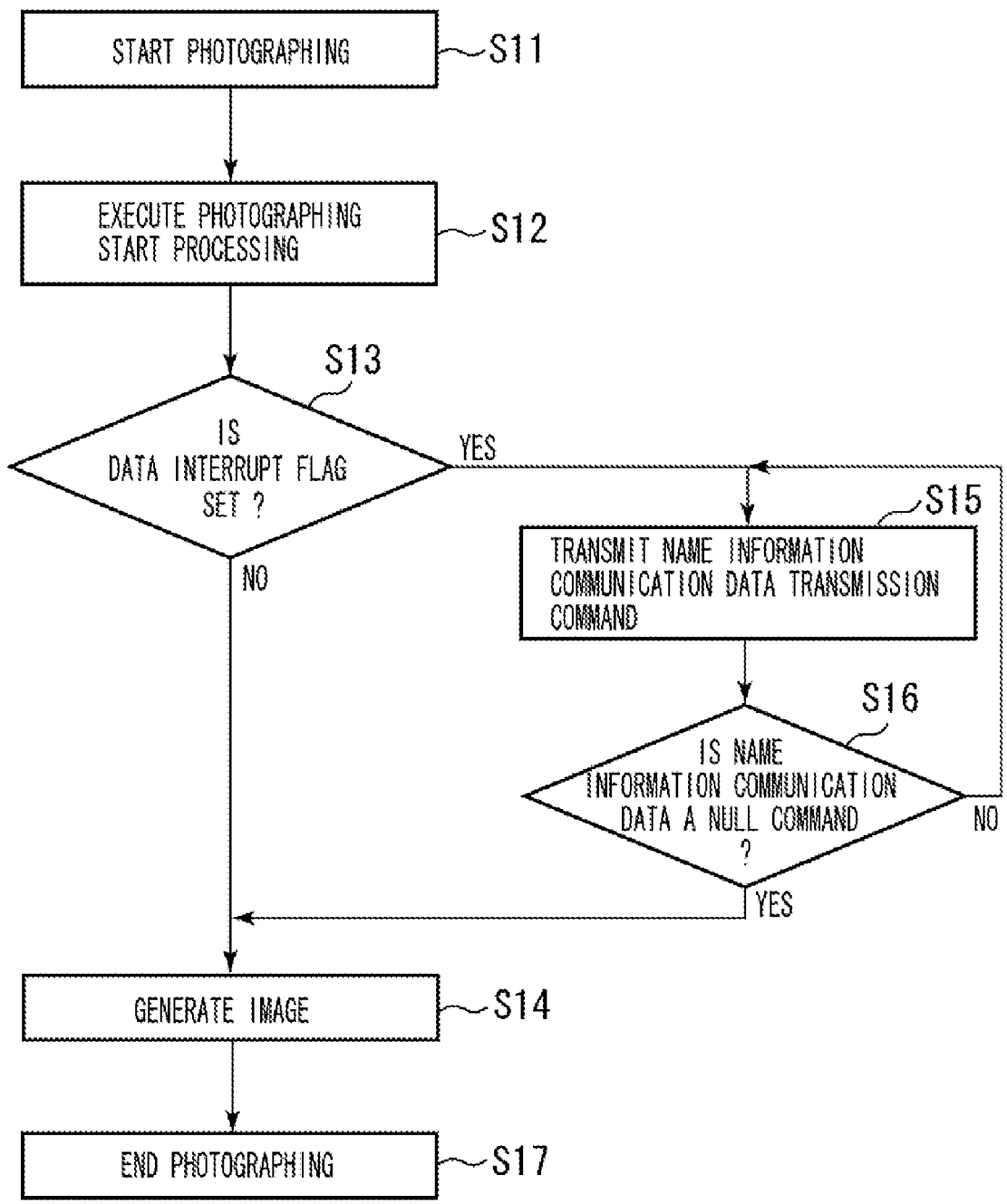

CAMERA, ACCESSORY, AND CAMERA SYSTEM

BACKGROUND OF THE INVENTION

1. Field of the Invention

The present invention relates to a camera, an accessory such as a photographic lens, and a camera system.

2. Description of the Related Art

A technique has been proposed in which a camera stores various types of information required for photographing in a read-only memory (ROM) (information fixed-storage circuit) included in an accessory, such as an interchangeable lens or a flash unit, mounted on the camera (camera body). Then, a microcomputer included in the camera body can designate an address of the ROM or a command via a microcomputer included in the accessory during photographing to allow the camera to obtain various information from the accessory.

Further, a technique has been proposed in which the name of a lens is transmitted via communication to enable identifying a type of the lens (Japanese Patent Application Laid-Open No. 2006-65068).

With the recent digitalization of cameras, information to be stored in a ROM of the accessory includes not only information required for photographing but also information appended to a photographed image and information used to make development, which converts photographed data into an image, high-quality. Attempts to acquire such information from the accessory as described above and to utilize the information on the camera side have been made.

Microcomputers for use in cameras and accessories have been made low in cost and large in capacity year after year to allow a huge amount of information to be stored on the accessory side. However, in order for a camera to acquire such a large amount of data from the accessory, an adequate length of communication time is required. Accordingly, if a photographer performs a photographing start operation during a period in which the camera is acquiring a large amount of data from the accessory, the photographer is required to wait until the camera reaches a photographing ready state since the camera is in the process of acquiring the data Furthermore, for example, if a photographer performs a photographing start operation during a period in which a camera is acquiring data that does not have a fixed length, such as the name of an accessory or aberration of a lens, shutter release timing cannot be fixed since the photographer does not find when the camera reaches a photographing ready stat. Thus, the photographer cannot grasp photographing timing. Accordingly, the photographer cannot perform desirable photographing.

SUMMARY OF THE INVENTION

The present invention is directed to a camera, an accessory, and a camera system that are capable of allowing comfortable photographing even when a larger amount of data is communicated between the accessory and the camera.

According to an aspect of the present invention, a camera includes a camera control unit configured to acquire information on an accessory mounted on the camera by performing communication with an accessory control unit included in the accessory and to control a photographing operation based on the information on the accessory, wherein, when the camera control unit acquires, from the accessory control unit, first information that is required prior to start of photographing and second information that is required prior to generation of image data after the start of photographing, if the camera control unit determines that a photographer has performed an operation to start a photographing operation during a period in which the camera control unit is performing communication to acquire the second information, the camera control unit executes a photographic sequence in priority to acquiring the second information and thereafter acquires the second information.

According to another aspect of the present invention, an accessory includes an accessory control unit configured to perform communication with a camera control unit included in a camera having the accessory mounted thereon and to transmit information on the accessory to the camera control unit, wherein the accessory control unit stores first information that is required prior to start of photographing and second information that is required prior to generation of image data after the start of photographing, and, if transmission of the second information to the camera control unit is interrupted, the accessory control unit thereafter resumes the transmission of the second information.

According to yet another aspect of the present invention, a camera system includes the above-described camera and the above-described accessory.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B are diagrams illustrate communication methods enabling interrupting and resuming communication according to an exemplary embodiment of the present invention.

FIG. 4 is a flowchart illustrating an operation performed when a camera resumes acquiring second information after communication is interrupted according to an exemplary embodiment of the present invention.

DETAILED DESCRIPTION OF THE EMBODIMENTS

Various exemplary embodiments, features, and aspects of the invention will be described in detail below with reference to the drawings.

Figure 1:
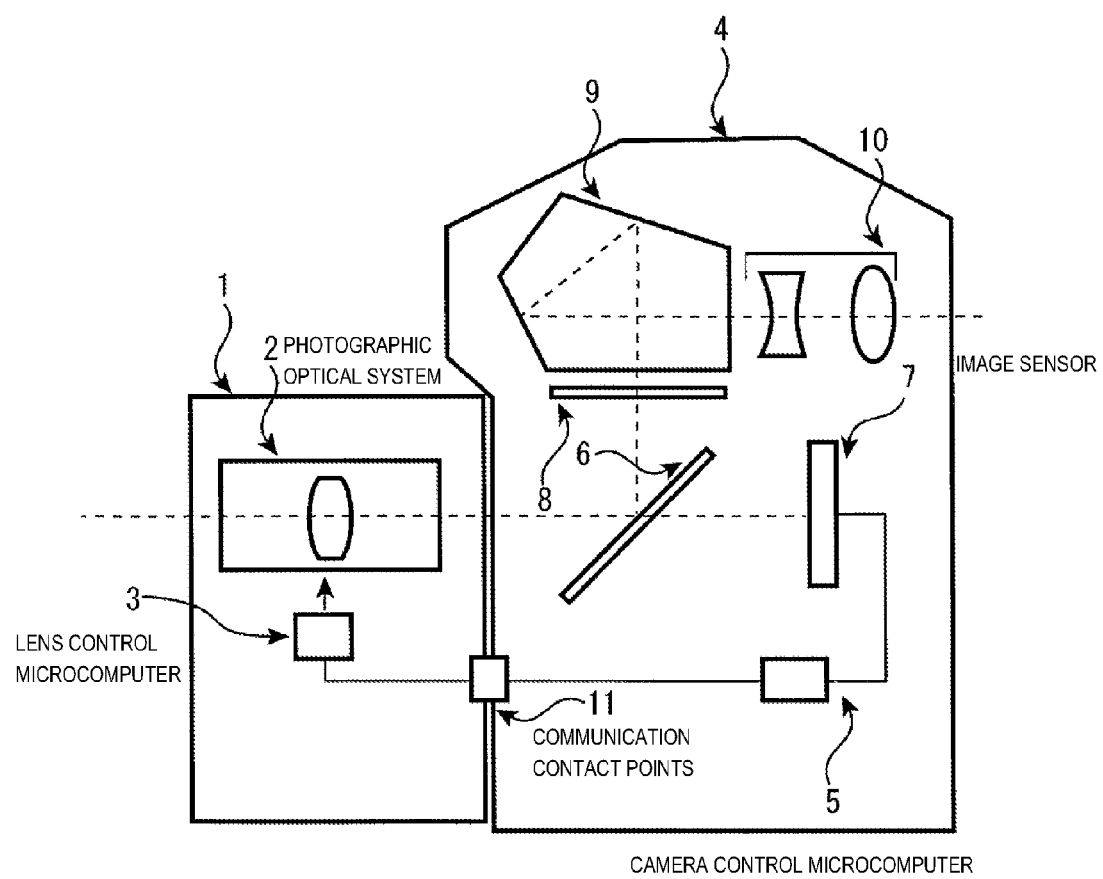
FIG. 1 is a diagram illustrating an example configuration of a digital single-lens reflex camera system according to an exemplary embodiment of the present invention.

FIG. 1 is a diagram illustrating an example configuration of a digital single-lens reflex camera system according to an exemplary embodiment of the present invention. The digital single-lens reflex camera system includes a photographic lens 1, which is one example of an accessory, and a camera (camera body) 4, which is detachably attached to the photographic lens 1.

The photographic lens 1 contains a photographic optical system 2 as an objective lens. The photographic optical system 2 includes one or a plurality of lens units (groups). The photographic optical system 2 can move the whole or a part thereof to change a focal length and to adjust a focus. A lens control microcomputer 3 is configured to control the photographic lens 1. The lens control microcomputer 3 includes a central processing unit (CPU) or the like.

The camera 4 includes a camera control microcomputer 5 configured to control the camera 4. The camera control microcomputer 5 includes a CPU or the like. Further, the camera 4 includes a main mirror 6 and a focusing screen 8. The main mirror 6 is movable into and out of a photographic light path. The camera 4 forms an object image on the focusing screen 8 with light reflected upward from the main mirror 6 located in the photographic light path. Further, the camera 4 includes a viewfinder optical system, which includes a pentagonal prism 9 and an eyepiece lens 10. The pentagonal prism 9 inverts the object image formed on the focusing screen 8. Furthermore, the camera 4 includes an image sensor 7.

When the photographic lens 1 is mounted on the camera 4, the digital single-lens reflex camera system enables information communication between the camera control microcomputer 5 and the lens control microcomputer 3 via communication contact points 11. The camera control microcomputer 5 and the lens control microcomputer 3 can communicate information reciprocally.

The lens control microcomputer 3 stores information (first information required prior to start of photographing), such as a focal length and an F-number, which is information required during photographing. First, the camera control microcomputer 5 can acquire such first information from the lens control microcomputer 3 prior to start of photographing. Further, the lens control microcomputer 3 stores information (second information required prior to generation of image data after the start of photographing), such as name information and aberration information on the photographic lens 1. After acquiring the first information, the camera control microcomputer 5 can acquire the second information from the lens control microcomputer 3 when a photographer mounts the photographic lens 1 on the camera 4 or when the digital single-lens reflex camera system can afford to perform communication prior to generation of image data after the start of photographing.

FIGS. 2A and 2B illustrate communication methods enabling interrupting and resuming communication between the camera control microcomputer 5 and the lens control microcomputer 3. More specifically, FIG. 2A illustrates a case where the camera control microcomputer 5 determines that a photographer has performed an operation to start a photographing operation during a period in which the camera control microcomputer 5 is performing communication for acquiring the second information from the lens control microcomputer 3. In this case, as described below with reference to a flowchart illustrated in FIG. 3, the camera control microcomputer 5 interrupts communication for acquiring the second information, which is required prior to generation of image data after the start of photographing, and executes a photographic sequence in priority to acquiring the second information.

Further, FIG. 2B illustrates a case where the camera control microcomputer 5 resumes interrupted communication to acquire the second information from the lens control microcomputer 3 when the digital single-lens reflex camera system can afford to perform communication prior to generation of image data after the start of photographing. In this case, as described below with reference to a flowchart illustrated in FIG. 4, the camera control microcomputer 5 resumes interrupted communication to acquire the second information when the digital single-lens reflex camera system can afford to perform communication prior to generation of image data after the start of photographing.

In a first communication method illustrated in FIG. 2A, the camera control microcomputer 5 transmits data "01", which represents a name information communication start command, to the lens control microcomputer 3. When the lens control microcomputer 3 receives the name information communication start command, the lens control microcomputer 3 transmits name information (DATA1, DATA2, DATA3, . . . ) on the photographic lens 1 stored in the lens control microcomputer 3 to the camera control microcomputer 5 each time the camera control microcomputer 5 transmits data "11", which represents a name information communication data transmission command. Then, when completing transmission of the name information, the lens control microcomputer 3 transmits null data "00", which represents end of transmission, to the camera control microcomputer 5. The camera control microcomputer 5 receives the null data, thus detecting the end of data. Then, the camera control microcomputer 5 ends communication. Thus, the camera control microcomputer 5 acquires name information on the photographic lens 1.

In a second communication method illustrated in FIG. 2B, the camera control microcomputer 5 transmits data "02", which represents a name information communication start command, to the lens control microcomputer 3. The lens control microcomputer 3 receives the name information communication start command. Then, when the camera control microcomputer 5 transmits data "22", which represents a name information communication data transmission command, to the lens control microcomputer 3, the lens control microcomputer 3 transmits data "n", which represents information on the amount of data, to the camera control microcomputer 5. The camera control microcomputer 5 transmits the name information communication data transmission command "22" to the lens control microcomputer 3 according to information on the amount of data. Then, the camera control microcomputer 5 acquires name information (DATA1, DATA2, DATA3, . . . , DATAn) on the photographic lens 1.

Figure 3:
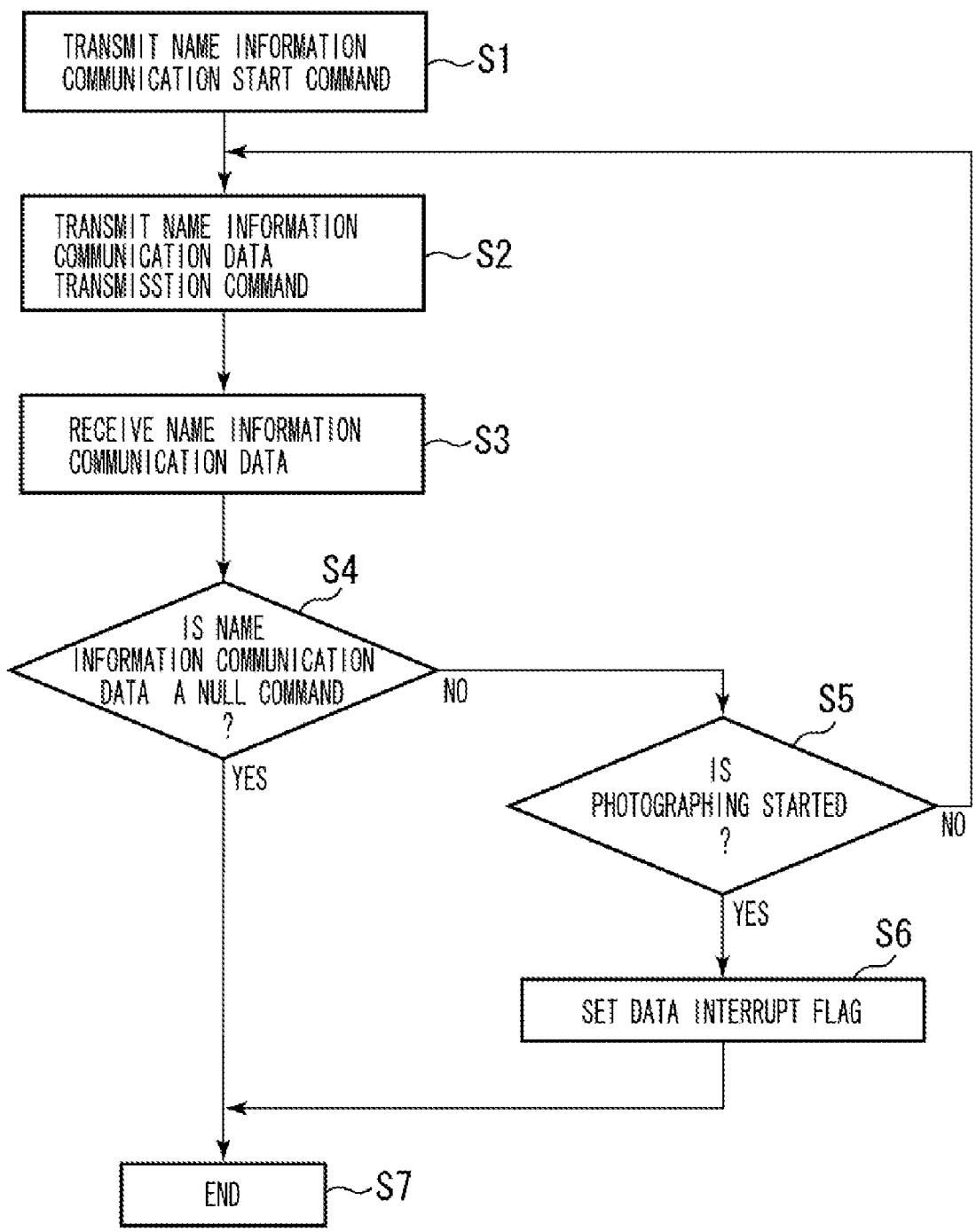
FIG. 3 is a flowchart illustrating an operation performed when communication is interrupted during a period in which a camera is acquiring second information from a lens control microcomputer according to an exemplary embodiment of the present invention.

FIG. 3 is a flowchart illustrating an operation performed when the camera control microcomputer 5 acquires the second information, such as lens name information, from the lens control microcomputer 3 using the first communication method.

In step S1, the camera control microcomputer 5 transmits a lens name information communication start command to the lens control microcomputer 3. In step S2, the camera control microcomputer 5 transmits a lens name information communication data transmission command to the lens control microcomputer 3. In step S3, when the lens control microcomputer 3 receives the lens name information communication data transmission command in step S2, since the lens control microcomputer 3 transmits lens name information communication data to the camera control microcomputer 5, the camera control microcomputer 5 acquires the lens name information communication data.

In step S4, the camera control microcomputer 5 determines whether the received lens name information communication data is a null command, which represents an end of data. If the received lens name information communication data is the null command (YES in step S4), the camera control microcomputer 5 determines that the camera control microcomputer 5 has completely acquired the lens name information communication data. The processing then proceeds to step S7, in which the processing ends.

On the other hand, if the camera control microcomputer 5 determines that the received lens name information communication data is not the null command (NO in step S4), the processing proceeds to step S5. In step S5, the camera control microcomputer 5 determines whether a photographer has performed an operation to start a photographing operation. If the photographer has not performed the operation to start a photographing operation (NO in step S5), the camera control microcomputer 5 returns to step S2 to acquire subsequent lens name information communication data. The camera control microcomputer 5 repeats a similar operation. If the camera control microcomputer 5 determines that the photographer has performed the operation to start a photographing operation (YES in step S5), the processing proceeds to step S6. In step S6, the camera control microcomputer 5 interrupts acquiring the lens name information communication data and sets a data interrupt flag indicating that the camera control microcomputer 5 has executed interrupt processing during acquisition of the lens name information communication data. The processing then proceeds to step S7, in which the processing ends.

FIG. 4 is a flowchart illustrating an operation performed when the camera control microcomputer 5 resumes communication to acquire lens name information from the lens control microcomputer 3 using the second communication method in a case where the lens name information communication data is interrupted as illustrated in FIG. 3.

In step S11, the camera control microcomputer 5 acquires information that is required for photographing, such as distance measurement information and light measurement information, from sensors (not illustrated) in the camera 4 prior to start of photographing. In step S12, the camera control microcomputer 5 executes actual photographing start processing. Note that the photographing start processing corresponds to timing when the camera 4 drives a shutter to enable external light to reach the image sensor 7, such as a charge-coupled device (CCD). In this instance, the camera control microcomputer 5 has already acquired the entire first information from the lens control microcomputer 3 prior to start of photographing.

In step S13, the camera control microcomputer 5 determines whether the data interrupt flag is set. If the data interrupt flag is not set (NO in step S13), the camera control microcomputer 5 determines that there was no interruption of communication during a period in which the camera control microcomputer 5 was acquiring the lens name information communication data. The processing then proceeds to step S14. On the other hand, if the data interrupt flag is set (YES in step S13), at a point of time when the camera 4 can afford to perform communication prior to generation of image data after the start of photographing, the camera control microcomputer 5 determines that there was an interruption of communication during a period in which the camera control microcomputer 5 was acquiring the lens name information communication data. The processing then proceeds to step S15. Note that the point of time when the camera 4 can afford to perform communication prior to generation of image data after the start of photographing refers to a point of time when distance measurement is not executed, when stop-down light measurement is not executed, or when exposure is performed.

In step S15, the camera control microcomputer 5 transmits the name information communication data transmission command to the lens control microcomputer 3 to resume acquiring the lens name information communication data. In step S16, the camera control microcomputer 5 determines whether the received lens name information communication data is a null command, which represents an end of data. If the received lens name information communication data is the null command (YES in step S16), the camera control microcomputer 5 determines that the camera control microcomputer 5 has completely acquired the lens name information communication data. The camera control microcomputer 5 ends communication. The processing then proceeds to step S14. If the received lens name information communication data is not the null command (NO in step S16), the processing returns to step S15.

In step S14, the camera control microcomputer 5 generates image data corresponding to a photographed image and executes processing for embedding the lens name information communication data in the image data. In step S17, the camera control microcomputer 5 ends the photographing operation.

According to the above-described exemplary embodiment, a camera classifies information stored in an accessory into first information that is required prior to start of photographing and second information that is required prior to generation of image data after the start of photographing. The second information is a large amount of data or data that does not have a fixed length, such as a name of the accessory. Then, when the camera determines that a photographer has performed an operation to start a photographing operation during a period in which the camera is acquiring the second information from the accessory, the camera interrupts acquiring the second information and performs a photographic sequence in priority to acquiring the second information. Thereafter, when the camera can afford to perform communication prior to generation of image data after the start of photographing, the camera resumes acquiring the second information.

Accordingly, an exemplary embodiment of the present invention can provide the photographic lens 1 and the camera 4 enabling comfortably performing photographing without extending a release time lag during photographing even if communication is executed between the photographic lens 1 and the camera 4 to require the first information and the second information.

Thus, an exemplary embodiment of the present invention can execute communication of a large amount of information (data) from the photographic lens 1 to the camera 4 without extending a release time lag during photographing while allowing a photographer to comfortably perform photographing. That is, since the camera can perform photographing at a similar timing even if information transmitted from the photographic lens 1 does not have a fixed length, the camera can securely perform photographing intended by a photographer.

In the above-described exemplary embodiment, the accessory is assumed to be the photographic lens 1. However, the accessory can be a flash unit or the like. Further, the above-described exemplary embodiment illustrates the case where the photographic lens 1 and the camera 4 perform a wired communication. However, the present invention can also be applied to a non-contact communication, such as wireless communication.

According to the above-described exemplary embodiment, the present invention can provide a camera, an accessory, or a camera system capable of allowing comfortable photographing without extending a release time lag during photographing even if communication of a large amount of data is executed between the accessory and the camera.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-038487 filed Feb. 19, 2007, which is hereby incorporated by reference herein in its entirety.

What is claimed is:

1. A camera comprising:
a camera control unit configured to acquire information on an accessory mounted on the camera by performing communication with an accessory control unit included in the accessory and to control a photographing operation based on the information on the accessory,
wherein, when the camera control unit acquires, from the accessory control unit, first information that is required prior to start of photographing and second information that is required prior to generation of image data after the start of photographing, if the camera control unit determines that a photographer has performed an operation to start a photographing operation during a period in which the camera control unit is performing communication to acquire the second information, the camera control unit executes a photographic sequence in priority to acquiring the second information and thereafter acquires the second information.

2. The camera as claimed in claim 1,
wherein, when the camera control unit acquires, from the accessory control unit, the first information and the second information, if the camera control unit determines that a photographer has performed an operation to start a photographing operation during a period in which the camera control unit is performing communication to acquire the second information, the camera control unit executes a photographic sequence in priority to acquiring the second information and thereafter acquires the second information when distance measurement is not executed, when stop-down light measurement is not executed, or when exposure is performed.

3. An accessory comprising:
an accessory control unit configured to perform communication with a camera control unit included in a camera having the accessory mounted thereon and to transmit information on the accessory to the camera control unit,
wherein the accessory control unit stores first information that is required prior to start of photographing and second information that is required prior to generation of image data after the start of photographing, and, if the camera control unit determines that a photographer has performed an operation to start a photographing operation during a period in which the accessory control unit is performing communication to transmit the second information, the accessory control unit interrupts transmission of the second information and thereafter resumes the transmission of the second information.

4. The accessory as claimed in claim 3,
wherein the accessory is either of a photographic lens or a flash unit.

5. A camera system comprising:
a camera having a camera control unit; and
an accessory having an accessory control unit,
wherein the camera control unit is configured to acquire information on the accessory mounted on the camera by performing communication with the accessory control unit included in the accessory and to control a photographing operation based on the information on the accessory, and
wherein the accessory control unit is configured to perform communication with the camera control unit included in the camera having the accessory mounted thereon and to transmit information on the accessory to the camera control unit,
wherein, when the camera control unit acquires, from the accessory control unit, first information that is required prior to start of photographing and second information that is required prior to generation of image data after the start of photographing, if the camera control unit determines that a photographer has performed an operation to start a photographing operation during a period in which the camera control unit is performing communication to acquire the second information, the camera control unit executes a photographic sequence in priority to acquiring the second information and thereafter acquires the second information, and
wherein the accessory control unit stores the first information and the second information, and, if transmission of the second information to the camera control unit is interrupted, the accessory control unit thereafter resumes the transmission of the second information.

6. A camera comprising:
a camera control unit configured to acquire information on an accessory mounted on the camera by performing communication with an accessory control unit included in the accessory and to control a photographing operation based on the information on the accessory,
wherein, when the camera control unit acquires, from the accessory control unit, first information of a focal length or an F-number of the accessory and second information of name information or aberration information of the accessory, if the camera control unit determines that a photographer has performed an operation to start a photographing operation during a period in which the camera control unit is performing communication to acquire the second information, the camera control unit executes a photographic sequence in priority to acquiring the second information and thereafter acquires the second information.

7. The camera as claimed in claim 6,
wherein, when the camera control unit acquires, from the accessory control unit, the first information and the second information, if the camera control unit determines that a photographer has performed an operation to start a photographing operation during a period in which the camera control unit is performing communication to acquire the second information, the camera control unit executes a photographic sequence in priority to acquiring the second information and thereafter acquires the second information when distance measurement is not executed, when stop-down light measurement is not executed, or when exposure is performed.

8. An accessory comprising:
an accessory control unit configured to perform communication with a camera control unit included in a camera having the accessory mounted thereon and to transmit information on the accessory to the camera control unit,
wherein the accessory control unit stores first information of a focal length or an F-number of the accessory and second information of name information or aberration information of the accessory, and, if the camera control unit determines that a photographer has performed an operation to start a photographing operation during a period in which the accessory control unit is performing communication to transmit the second information, the accessory control unit interrupts transmission of the second information and thereafter resumes the transmission of the second information.

9. The accessory as claimed in claim 8,
wherein the accessory is a photographic lens.

* * * * *